2,889,333

PRODUCTION OF HYDANTOINS

James N. Coker and Melvin Fields, Wilmington, Del., and Arthur O. Rogers, Lewiston, N.Y., assignors to E. I. du Pont de Nemours and Company, Wilmington, Del., a corporation of Delaware No Drawing. Application September 17, 1957
Serial No. 684,417

4 Claims. (Cl. 260—309.5)

This invention is concerned with the preparation of hydantoins, and is more particularly concerned with the conversion of azines to hydantoins.

It is known that aldehydes and ketones can be converted to hydantoins with ammonium carbonate and cyanides, and that the resulting hydantoins can readily be hydrolyzed to form valuable amino acids. Suitable methods are disclosed in the publications, H. T. Bucherer et. al., "Über die Bildung substituierter Hydantoine aus Aldehyden und Ketonen," J. Prakt. Chem., 141, 5–43 (1934), and W. Gebhardt, "Über Hydantoine, Thiohydantoine, Sulfothiazolidon- und Sulfothiazolidoniminderivate," diss. Technischen Hochschule Munchen, 38 pages (1935). However, the preparation and isolation of aldehyde or ketone starting materials of suitable stability and reactivity for the conversion has imposed serious practical limitations on the hydantoins and corresponding amino acids which can be prepared commercially.

It is an object of this invention to provide a more generally useful process for preparing hydantoins which does not depend upon isolation of aldehyde or ketone starting reactants. Other objects will become apparent from the specification and claims.

In accordance with this invention aldehyde or ketone azines of the general formula,

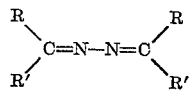

wherein R is an alkyl, aralkyl or aryl hydrocarbon group and R' is hydrogen or an alkyl, aralkyl or aryl hydrocarbon group, are readily converted to hydantoins by heating a reaction mixture of the azine and a solution containing ammonium ions, carbon dioxide or carbonate ions and cyanide ions. The hydrocarbon groups represented by R and R' may be alike or different and are preferably lower alkyl, aralkyl or aryl.

In the process of this invention, an azine consisting of carbon, hydrogen and two nitrogen atoms is heated in a reaction mixture containing ammonium ions, carbonate ions and cyanide ions in solution in an inert polar solvent, preferably water or a lower alcohol or a mixture thereof. Ammonium carbonate and hydrogen cyanide are the most convenient sources of the required ions, but other materials can obviously be used to form these ions in solution. Thus carbon dioxide and ammonia or various ammonium salts can be added separately, in place of ammonium carbonate, and metal cyanides can be used in place of hydrogen cyanide. Solid carbon dioxide can be added to increase the concentration of carbon dioxide in solution. The addition of a small amount of sodium hydrogen sulfite or other bisulfite will usually increase the yield, but is not essential. The yield may also be improved by complete exclusion of oxygen from the reaction. A reaction temperature of about 40° C. to 220° C., with a preferred range of 100–150° C., is suitable, with pressure being required at the higher temperatures. At about 100° C. the reaction is usually complete in about 3 to 4 hours. The hydantoin can generally be separated from the reaction mixture by filtration as a relatively insoluble product. The yield can often be improved by concentrating the filtrate or salting out soluble product with neutral salts, e.g., sodium sulfate. The hydantoin is purified by recrystallization from water or other solvent.

The reaction mechanism is not understood, but the overall result appears to be as follows:

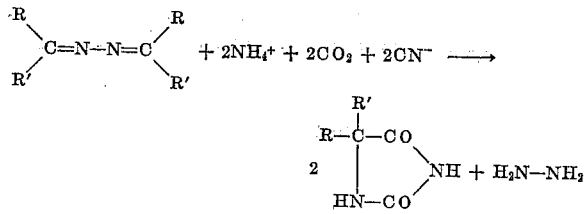

An advantage of process, therefore, is that the above reaction gives two moles of hydantoin from one mole of starting material.

The process is further illustrated by the specific embodiments of the invention shown in the examples, in which parts are by weight.

Example I

An appropriately sized vessel was charged with a mixture of methyl isobutyl ketone azine (6.8 parts), ammonium carbonate (11 parts), sodium hydrogen sulphite (1 part), methanol (40 parts), water (40 parts) and hydrogen cyanide (3 parts). The vessel was sealed and heated at 100° for 3½ hours. The contents of the vessel were removed and evaporated to a small volume. The product was obtained as a mass of prismatic needles (7.3 parts; yield 63%) M.P. 146–147°, and was identified as 5-methyl-5-isobutyl-hydantoin by M.P. and analysis.

Analysis.—$C_8H_{14}O_2N_2$

|   | Calculated | Found |
|---|---|---|
| C | 56.5 | 56.6 |
| H | 8.2 | 8.6 |
| N | 16.5 | 16.6 |

In the absence of sodium hydrogen sulphite the same product was obtained in 28% yield at these conditions.

Example II

When dibenzalazine was substituted for the methyl isobutyl ketone azine of Example I, 5-phenyl hydantoin (M.P. 180–182° C.) was obtained in 54% yield by the same procedure.

Analysis

|   | $C_9H_8N_2O_2.H_2O$, calculated | $C_9H_8N_2O_2$ | |
|---|---|---|---|
|   |   | Calculated | Found |
| C | 55.7 | 61.4 | 57.6 |
| H | 5.1 | 4.5 | 5.1 |
| N | 14.4 | 16.2 | 15.1 |

The azine starting materials used in the process of this invention are known compounds. The hydantoin products have previously been prepared by other methods and are known to produce amino acids upon hydrolysis. The invention, therefore, is of particular importance as providing an improved route to valuable amino acids.

Since many different embodiments of the invention may be made without departing from the spirit and scope

We claim:
1. The process for producing a hydantoin which comprises heating an azine of the general formula

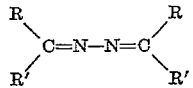

wherein R is a hydrocarbon group and R' is a member selected from the group consisting of hydrogen and hydrocarbon in a reaction mixture containing ammonium ions, carbonate ions and cyanide ions in solution.

2. The process for producing a hydantoin which comprises heating a reaction mixture of an azine of the general formula

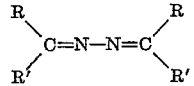

wherein R is a hydrocarbon group and R' is a member selected from the group consisting of hydrogen and hydrocarbon and a solution containing ammonium ions, carbonate ions and cyanide ions at a temperature of 40° to 220° C. and recovering the hydantoin product.

3. The process for producing 5-methyl-5-isobutylhydantoin which comprises heating a reaction mixture of methyl isobutyl ketone azine and a solution containing ammonium ions, carbonate ions and cyanide ions at a temperature of 40° to 220° C. and recovering the hydantoin product.

4. The process for producing 5-phenylhydantoin which comprises heating a reaction mixture of dibenzalazine and a solution containing ammonium ions, carbonate ions and cyanide ions at a temperature of 40° to 220° C. and recovering the hydantoin product.

References Cited in the file of this patent
UNITED STATES PATENTS 2,717,252  Holland _____ Sept. 6, 1955
2,717,253  Holland _____ Sept. 6, 1955